(12) United States Patent
Li et al.

(10) Patent No.: US 8,913,572 B2
(45) Date of Patent: Dec. 16, 2014

(54) RADIO SELF-BACKHAUL METHOD, DEVICE, AND SYSTEM

(75) Inventors: Jie Li, Shenzhen (CN); Qiandong Ren, Shenzhen (CN); Yali Qin, Shenzhen (CN); Weimin Ying, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 96 days.

(21) Appl. No.: 13/360,247

(22) Filed: Jan. 27, 2012

(65) Prior Publication Data

US 2012/0127941 A1 May 24, 2012

Related U.S. Application Data

(63) Continuation of application No. PCT/CN2010/075154, filed on Jul. 14, 2010.

(30) Foreign Application Priority Data

Jul. 28, 2009 (CN) .......................... 2009 1 0089928

(51) Int. Cl.
| | | |
|---|---|---|
| H04W 4/00 | (2009.01) | |
| H04B 7/14 | (2006.01) | |
| H04W 88/08 | (2009.01) | |
| H04B 7/15 | (2006.01) | |
| H04W 92/04 | (2009.01) | |

(52) U.S. Cl.
CPC ............. *H04W 88/08* (2013.01); *H04B 7/15* (2013.01); *H04W 92/045* (2013.01)
USPC ........... 370/329; 370/315; 370/466; 370/469; 455/11.1

(58) Field of Classification Search
None
See application file for complete search history.

(56) References Cited

U.S. PATENT DOCUMENTS

| | | | |
|---|---|---|---|
| 7,321,571 B2 | 1/2008 | Schnack et al. | |
| 2004/0062214 A1* | 4/2004 | Schnack et al. | ............... 370/315 |
| 2007/0076608 A1* | 4/2007 | Samuel et al. | ............... 370/230 |
| 2007/0110005 A1 | 5/2007 | Jin et al. | |
| 2007/0160019 A1 | 7/2007 | Classon et al. | |
| 2009/0080418 A1* | 3/2009 | Koide | ........................... 370/389 |

(Continued)

FOREIGN PATENT DOCUMENTS

| | | |
|---|---|---|
| CN | 101009612 A | 8/2007 |
| CN | 101335715 A | 12/2008 |

(Continued)

OTHER PUBLICATIONS

International Search Report and Written Opinion of the International Searching Authority issued in corresponding PCT Patent Application No. PCT/CN2010/075154, mailed Nov. 4, 2010.

(Continued)

*Primary Examiner* — Yemane Mesfin
*Assistant Examiner* — Peter Chen
(74) *Attorney, Agent, or Firm* — Brinks Gilson & Lione

(57) ABSTRACT

Embodiments of the present invention relate to a radio self-backhaul method, device, and system in an evolved network. With the radio self-backhaul method, device, and system provided in the embodiments of the present invention, the NodeB sends the uplink data to the core network by using the cable transmission link without occupying the radio resources of other NodeBs. This implements the radio self-backhaul for the NodeB, saves the radio transmission resources of the NodeB, and mitigates the impact on the radio network throughput.

17 Claims, 4 Drawing Sheets

(56) References Cited

U.S. PATENT DOCUMENTS

| | | |
|---|---|---|
| 2009/0103492 A1 | 4/2009 | Altshuller et al. |
| 2009/0116393 A1 | 5/2009 | Hughes et al. |
| 2010/0074189 A1* | 3/2010 | Wang et al. .................. 370/329 |
| 2010/0110998 A1* | 5/2010 | Erceg et al. .................. 370/329 |
| 2010/0165957 A1* | 7/2010 | Hegde et al. .................. 370/338 |
| 2011/0032879 A1* | 2/2011 | Beaudin et al. .................. 370/328 |
| 2011/0243097 A1* | 10/2011 | Lindqvist et al. .................. 370/331 |
| 2012/0014346 A1* | 1/2012 | Deguchi et al. .................. 370/329 |

FOREIGN PATENT DOCUMENTS

| | | |
|---|---|---|
| CN | 101616439 A | 12/2009 |
| EP | 2296426 A1 | 3/2011 |
| WO | WO 02/17599 A2 | 2/2002 |

OTHER PUBLICATIONS

Extended European Search Report issued in corresponding PCT Patent Application No. 10803882.9, mailed Apr. 26, 2012.

Office Action issued in corresponding Chinese Patent Application No. 200910089928.0, mailed Dec. 6, 2010.

Office Action issued in corresponding Chinese Patent Application No. 200910089928.0, mailed Jun. 24, 2011.

* cited by examiner

RADIO SELF-BACKHAUL METHOD, DEVICE, AND SYSTEM

CROSS-REFERENCE TO RELATED APPLICATIONS

This application is a continuation of International Application No. PCT/CN2010/075154, filed on Jul. 14, 2010, which claims priority to Chinese Patent Application No. 200910089928.0, filed on Jul. 28, 2009, both of which are hereby incorporated by reference in their entireties.

FIELD OF THE INVENTION

The present invention relates to the field of communication technologies, and in particular, to a radio self-backhaul method, device, and system.

BACKGROUND OF THE INVENTION

With the large-scale application of a radio communication network, how to rapidly deploy the network and how to reduce the network costs become critical issues for mobile operators. During the building of a radio network architecture, the backhaul part of a NodeB is a major factor causing high costs of radio network deployment and a high operating expenditure.

For example, in a wideband code division multiple access (Wideband Code Division Multiple Access, WCDMA) mobile communication system, backhaul of the NodeB refers to establishing a secure and reliable transmission means between a NodeB and a radio network controller (Radio Network Controller, RNC) in a radio access network (Radio Access Network, RAN) by using multiple physical media. A user equipment (User Equipment, UE) needs to access a mobile network by using the RAN and obtain the mobile service. Therefore, the network quality of the backhaul of the NodeB directly determines whether operators can quickly respond to the requirements during service development.

During the implementation of the present invention, the inventor finds that the prior art has at least the following defect:

The conventional cable backhaul presents issues such as high engineering costs, long construction period, high operating expenditure, and complex site selection and deployment, which hinder further development.

SUMMARY OF THE INVENTION

The objectives of embodiments of the present invention are to provide a radio self-backhaul method, device, and system to implement backhaul by using radio resources of a NodeB without occupying radio resources of other NodeBs and to mitigate the impact on the radio network throughput while saving cable transmission resources.

An embodiment of the present invention provides a radio self-backhaul method, including:

receiving, by a radio self-backhaul device, user uplink data that is sent by a NodeB using downlink radio resources of the NodeB, where the user uplink data is uplink data sent by a UE to the NodeB by using an uplink radio link, where the radio self-backhaul device is set within the coverage of the NodeB and has cable transmission resources; and performing, by the radio self-backhaul device, protocol processing on the user uplink data, and sending the user uplink data that undergoes the protocol processing to a core network by using a cable transmission link.

An embodiment of the present invention provides a radio self-backhaul device, including:

a data receiving module, configured to receive uplink data that is sent by a NodeB using downlink radio resources of the NodeB, where the uplink data is uplink data sent by a UE to the NodeB by using an uplink radio link, where the radio self-backhaul device is set within the coverage of the NodeB and has cable transmission resources;

a processing module, configured to perform protocol processing on the uplink data; and a data sending module, configured to send the uplink data that undergoes the protocol processing to a core network by using a cable transmission link.

An embodiment of the present invention provides a radio self-backhaul system, including: the radio self-backhaul device, and the NodeB transmitting data with the radio self-backhaul device according to the above technical solutions.

With the radio self-backhaul method, device, and system provided in the embodiments of the present invention, backhaul data is sent by using the radio resources of the NodeB, which saves the radio transmission resources of the NodeB and does not occupy the radio resources of other NodeBs. Therefore, the impact on the radio network throughput is mitigated.

BRIEF DESCRIPTION OF THE DRAWINGS

To make the technical solutions provided in embodiments of the present invention or the prior art clear, the accompanying drawings for illustrating the embodiments of the present invention or the prior art are briefly described below. Apparently, the accompanying drawings are exemplary only, and persons skilled in the art can derive other drawings from such accompanying drawings without any creative effort.

DETAILED DESCRIPTION OF THE EMBODIMENTS

The technical solution of the present invention is described clearly and completely in the following with reference to the embodiments and accompanying drawings. Evidently, the embodiments are exemplary only, without covering all embodiments of the present invention. Persons skilled in the art can derive other embodiments from the embodiments given herein without making any creative effort, and all such embodiments are covered in the protection scope of the present invention.

In the embodiments of the present invention, for ease of description, a device that is set at a radio access point and implements data transmission between the device and a NodeB over a radio transmission link and data transmission between the device and a core network over a cable transmission link is referred to as a self-backhaul UE (Backhaul-User Equipment, B-UE). The B-UE is located within the coverage of the NodeB and has cable resources. Data is forwarded over the cable transmission link between the B-UE and the core network and the radio transmission link between the B-UE and the NodeB. This implements transfer of the backhaul traffic between the NodeB and the core network, thereby implementing radio self-backhaul for the NodeB.

Figure 1:
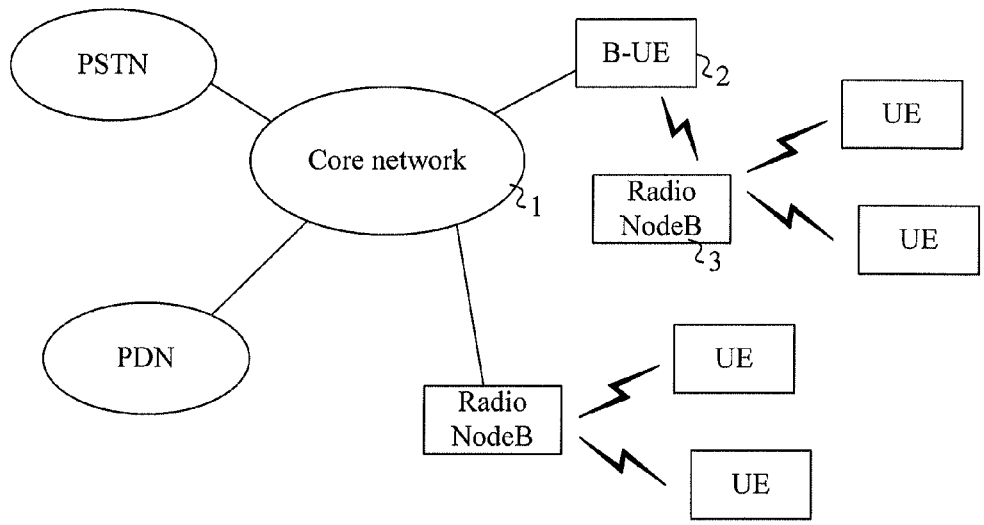
FIG. 1 is a schematic architecture diagram of a long term evolution network applicable to embodiments of the present invention.

FIG. 1 is a schematic architecture diagram of an LTE (Long Term Evolution) network applicable to embodiments of the present invention. As shown in FIG. 1, the evolved network architecture includes: a core network 1, a B-UE 2 connected to the core network 1 by using a cable, and a radio NodeB 3 connected to the B-UE 2 by using a radio link.

To support the existing network architecture, current networks such as the public switched telephone network (Public Switched Telephone Network, PSTN) and the public data network (Public Data Network, PDN) can access the core network 1. Multiple B-UEs 2 may access the core network 1 by using cables. Each radio NodeB 3 can serve multiple UEs (common UEs).

It should be noted that this embodiment uses the LTE system as an example for description. However, it can be understood that the technical solution provided in this embodiment is also applicable to other systems, such as the global system for mobile communications (Global System For Mobile Communications, GSM), time division-synchronous code division multiple access (Time Division-Synchronous Code Division Multiple Access, TD-SCDMA), code division multiple access CMDA2000, worldwide interoperability for microwave access (Worldwide Interoperability for Microwave Access, WIMAX), and WCDMA. For example, in the WCDMA system, radio backhaul data may be sent by the B-UE to an RNC, and then transmitted to the core network.

In the embodiments of the present invention, a protocol header, also called "packet header" or "protocol stack header", is information such as an identifier and a sequence number added when data is encapsulated so that the encapsulated data can be correctly identified and parsed.

Figure 2:
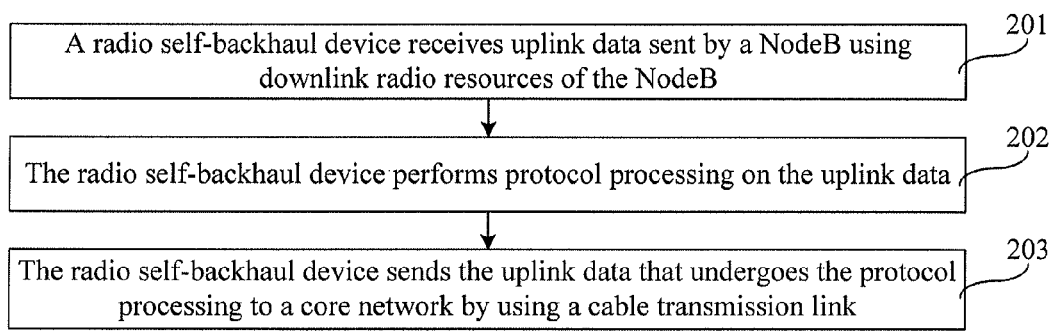
FIG. 2 is a schematic flowchart of a method for radio self-backhaul in an evolved network according to an embodiment of the present invention.

FIG. 2 is a schematic flowchart of a method for radio self-backhaul in an evolved network according to an embodiment of the present invention. As shown in FIG. 2, the method embodiment includes the following steps:

Step 201: A radio self-backhaul device receives uplink data sent by a NodeB using downlink radio resources of the NodeB.

In step 201, the uplink data is uplink data sent by a UE to the NodeB by using an uplink radio link. The radio self-backhaul device is set within the coverage of the NodeB and has cable transmission resources.

Step 202: The radio self-backhaul device performs protocol processing on the uplink data.

Step 203: The radio self-backhaul device sends the uplink data that undergoes the protocol processing to a core network by using a cable transmission link.

With the method for radio self-backhaul in an evolved network according to this embodiment, after performing protocol processing on the uplink data sent by the NodeB by using the downlink radio resources of the NodeB, the radio self-backhaul device sends the uplink data that undergoes the protocol processing to the core network by using the cable transmission link. The NodeB implements radio self-backhaul without occupying the radio resources of other NodeBs. The NodeB uses its radio resources to send the uplink backhaul data, which saves the radio transmission resources of the NodeB without occupying the radio resources of other NodeBs, and mitigates the impact on the radio network throughput.

Figure 3:
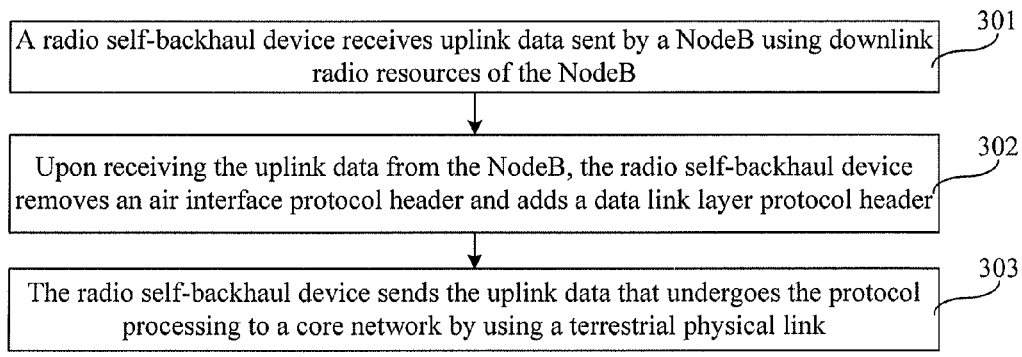
FIG. 3 is a schematic flowchart of a method for radio self-backhaul in an evolved network according to an embodiment of the present invention.
Figure 4:
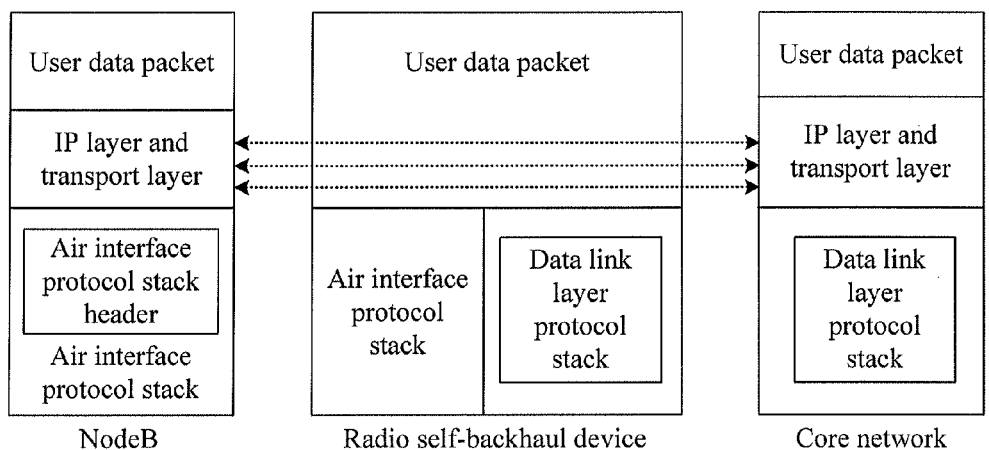
FIG. 4 is a schematic structural diagram of an interface protocol stack according to the embodiment shown in FIG. 3.

FIG. 3 is a schematic flowchart of a method for radio self-backhaul in an evolved network according to another embodiment of the present invention. FIG. 4 is a schematic structural diagram of an interface protocol stack according to the embodiment shown in FIG. 3. As shown in FIG. 3, this embodiment includes the following steps:

Step 301: A radio self-backhaul device receives user uplink data sent by a NodeB using downlink radio resources of the NodeB.

In step 301, the user uplink data is uplink data sent by a UE to the NodeB by using an uplink radio link. The radio self-backhaul device is set within the coverage of the NodeB and has cable transmission resources.

Step 302: When receiving the uplink data from the NodeB, the radio self-backhaul device removes an air interface protocol header and adds a data link layer protocol header.

In step 302, the interface protocol stack is specifically an air interface protocol stack at the NodeB, and the uplink data is formed by adding the air interface protocol header of the air interface protocol stack to a user data packet and encapsulating the user data packet according to the requirement of the radio air interface. After receiving the uplink data, the radio self-backhaul device removes the air interface protocol header of the uplink data and adds a data link layer protocol header so that the uplink data can be transmitted over a cable transmission link. As shown in FIG. 4, the air interface protocol stack of the radio self-backhaul device corresponds to the air interface protocol stack of the NodeB, and the data link layer protocol stack of the radio self-backhaul device corresponds to the data link layer protocol stack of the core network.

Step 303: The radio self-backhaul device sends the uplink data that undergoes the protocol processing to a core network by using a terrestrial physical link.

In step 303, the terrestrial physical link is a term defined relative to the radio transmission link, and is specifically a physical communication link implemented by using a cable transmission medium, for example, a coaxial cable and a twisted pair. The radio self-backhaul device sends the uplink data added with the data link layer protocol header to the core network by using the terrestrial physical link so that the core network, after receiving the uplink data added with the data link layer protocol header, removes the data link layer protocol header to restore the user data packet in the uplink data. In this way, data exchange is implemented between the NodeB and the core network.

In this embodiment, the interface protocol stack as shown in FIG. 4 is applicable to the scenario that the uplink data is transparently transmitted at the Internet Protocol (IP) layer and its upper transport layer.

With the method for radio self-backhaul in an evolved network according to this embodiment, after removing the air interface protocol header from the uplink data sent by the NodeB by using the radio resources of the NodeB, and adding the data link layer protocol header to the uplink data, the radio self-backhaul device sends the uplink data to the core network by using the terrestrial physical link. The NodeB implements radio self-backhaul without occupying the radio resources of other NodeBs. The NodeB uses its downlink radio resources to send the uplink data, which saves the radio transmission resources of the NodeB without occupying the radio resources of other NodeBs, and mitigates the impact on the radio network throughput.

Further, based on the embodiment shown in FIG. 3, this embodiment may include the following steps:

the radio self-backhaul device receives downlink data sent by a core network by using a cable transmission link; and the radio self-backhaul device performs protocol processing on the downlink data, and sends the downlink data that undergoes the protocol processing to a NodeB by using an uplink radio link.

Specifically, performing protocol processing by the radio self-backhaul device on the downlink data may include the following:

If the downlink data is transparently transmitted at the IP layer and its upper transport layer, the radio self-backhaul device removes the data link layer protocol header from the downlink data, adds an air interface protocol header for transmission of the downlink data over the radio communication link, and sends the downlink data added with the air interface protocol header to the NodeB by using the radio communication link. The NodeB, after receiving the downlink data added with the air interface protocol header, restores the user data packet in the downlink data by removing the air interface protocol header, and sends the restored downlink data to the UE.

The above procedures implement exchange of uplink data and downlink data between a UE and the core network.

Figure 5:
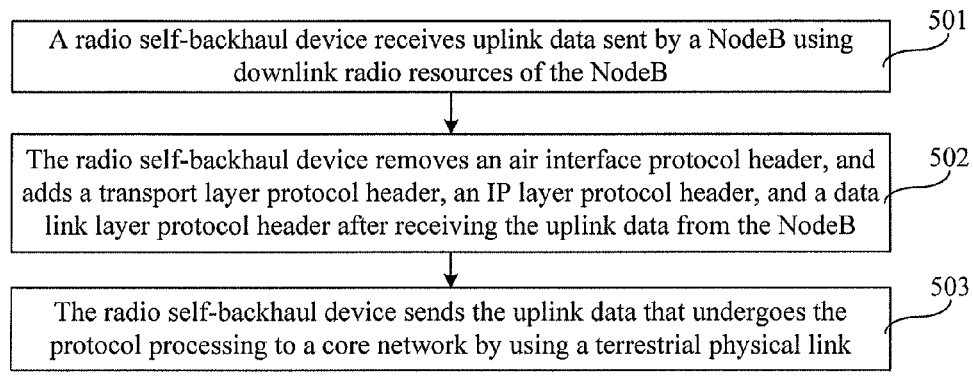
FIG. 5 is a schematic flowchart of a method for radio self-backhaul in an evolved network according to another embodiment of the present invention.
Figure 6:
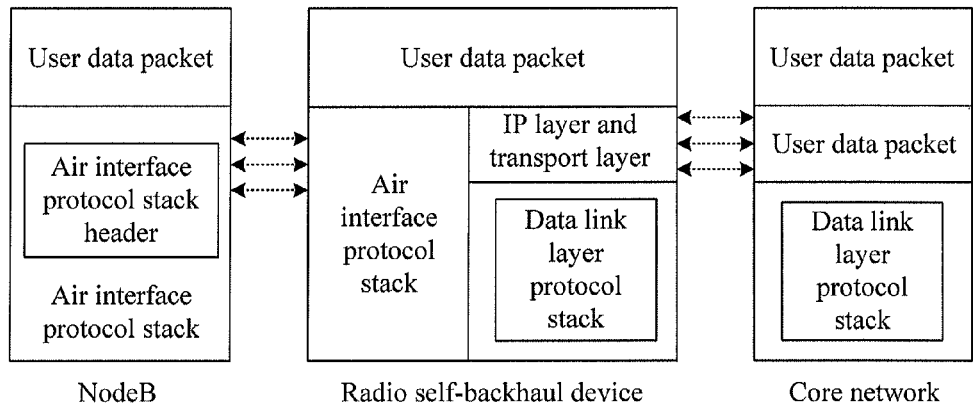
FIG. 6 is a schematic structural diagram of an interface protocol stack according to the embodiment shown in FIG. 5.

FIG. 5 is a schematic flowchart of a method for radio self-backhaul in an evolved network according to another embodiment of the present invention. FIG. 6 is a schematic structural diagram of an interface protocol stack according to the embodiment shown in FIG. 5. As shown in FIG. 5, this embodiment includes the following steps:

Step 501: A radio self-backhaul device receives uplink data sent by a NodeB using downlink radio resources of the NodeB.

In step 501, the uplink data is uplink data sent by a UE to the NodeB by using an uplink radio link. The radio self-backhaul device is set within the coverage of the NodeB and has cable transmission resources.

Step 502: The radio self-backhaul device removes an air interface protocol header, and adds a transport layer protocol header, an IP layer protocol header, and a data link layer protocol header after receiving the uplink data from the NodeB.

In step 502, the uplink data is formed by adding the air interface protocol header of the air interface protocol stack to a user data packet and encapsulating the user data packet according to the requirement of the radio air interface. After receiving the uplink data, the radio self-backhaul device removes the air interface protocol header of the uplink data, and adds a transport layer protocol header, an IP layer protocol header, and a data link layer protocol header so that the uplink data can be sent to a core network over a terrestrial physical link. As shown in FIG. 6, the air interface protocol stack of the radio self-backhaul device corresponds to the air interface protocol stack of the NodeB, and the data link layer protocol stack of the radio self-backhaul device corresponds to the data link layer protocol stack of the core network.

Step 503: The radio self-backhaul device sends the uplink data that undergoes the protocol processing to a core network by using a terrestrial physical link.

In step 503, the terrestrial physical link is a term defined relative to the radio transmission link, and is specifically a physical communication link implemented by using a cable transmission medium, for example, a coaxial cable and a twisted pair. The radio self-backhaul device sends the uplink data added with the transport layer protocol header, the IP layer protocol header, and the data link layer protocol header to the core network by using the terrestrial physical link so that the core network, after receiving the uplink data added with the transport layer protocol header, the IP layer protocol header, and the data link layer protocol header, removes the transport layer protocol header, the IP layer protocol header, and the data link layer protocol header to restore the user data packet in the uplink data. In this way, data exchange is implemented between the NodeB and the core network.

In this embodiment, the interface protocol stack as shown in FIG. 6 is applicable to the scenario that a radio self-backhaul device needs to parse uplink data at the IP layer and transport layer and forward the uplink data.

With the method for radio self-backhaul in an evolved network according to this embodiment, after removing the air interface protocol header from the uplink data sent by the NodeB by using the downlink radio resources of the NodeB, and adding the transport layer protocol header, IP layer protocol header, and data link layer protocol header to the uplink data, the radio self-backhaul device sends the uplink data to the core network by using the terrestrial physical link. The NodeB implements radio self-backhaul without occupying the radio resources of other NodeBs. The NodeB uses its downlink radio resources to send the uplink data, which saves the radio transmission resources of the NodeB without occupying the radio resources of other NodeBs, and mitigates the impact on the radio network throughput.

Further, based on the embodiment shown in FIG. 5, this embodiment may include the following steps:

the radio self-backhaul device receives downlink data sent by a core network by using a cable transmission link; and the radio self-backhaul device performs protocol processing on the downlink data, and sends the downlink data that undergoes the protocol processing to a NodeB by using an uplink radio link.

Specifically, performing protocol processing by the radio self-backhaul device on the downlink data may include the following:

If the radio self-backhaul device needs to parse and forward the downlink data at the IP layer and the transport layer, the radio self-backhaul device removes the transport layer protocol header, the IP protocol header, and the data link protocol layer header from the downlink data, adds an air interface protocol stack header to the downlink data for transmission of the downlink data over the radio communication link, and sends the downlink data added with the air interface protocol stack header to a radio NodeB by using the uplink spectrum of the radio communication link. The radio NodeB, after receiving the downlink data added with the air interface protocol stack header, restores the downlink data by removing the air interface protocol stack header, and sends the restored downlink data to the UE.

The above procedures implement exchange of uplink data and downlink data between a UE and the core network.

Further, based on the embodiments shown in FIG. 2, FIG. 3, and FIG. 5, this embodiment may include an access procedure of the radio self-backhaul device, which includes:

sending, by the radio self-backhaul device, an access request message carrying a channel associated identifier to the NodeB by using the access resources the same as a common UE so that the NodeB distinguishes the radio self-backhaul device and the common UE according to the channel associated identifier when receiving the access request message; or sending, by the radio self-backhaul device, an access request message to the NodeB by using access resources different from the common UE so that the NodeB distinguishes the radio self-backhaul device and the common UE according to the different access resources.

After the access procedure initiated by the radio self-backhaul device is complete, the core network does not need to obtain the information about the radio self-backhaul device; and therefore the NodeB does not send the information about the radio self-backhaul device to the core network. Therefore, the radio self-backhaul device is invisible in the core network, which reduces the signaling interaction.

Further, in the embodiments shown in FIG. FIG. 2, FIG. 3, and FIG. 5, the radio self-backhaul device uses the radio spectrum resources shared with the common UE within the coverage of the NodeB to receive the uplink data from the NodeB. Optionally, the radio self-backhaul device may also use the radio spectrum resources not shared with the common UE within the coverage of the NodeB to receive the uplink data from the NodeB.

Similarly, when the core network sends the downlink data to the UE, the radio self-backhaul device uses the radio spectrum resources shared with the common UE within the coverage of the NodeB to send the downlink data to the NodeB. Optionally, the radio self-backhaul device may also use the radio spectrum resources not shared with the common UE within the coverage of the NodeB to send the downlink data to the NodeB.

Further, in the embodiments shown in FIG. FIG. 2, FIG. 3, and FIG. 5, the radio self-backhaul device may be a B-UE, the NodeB may be specifically an evolved NodeB (eNodeB), and the core network may be specifically a system architecture evolution gateway (System Architecture Evolution Gate Way, SAE-GW) or a mobility management entity (Mobility Management Entity, MME). Specifically, if the data sent by the B-UE to the core network is control signaling, the SAE-GW receives the control signaling; if the data sent by the B-UE to the core network is service data, the MME receives the service data.

Figure 7:
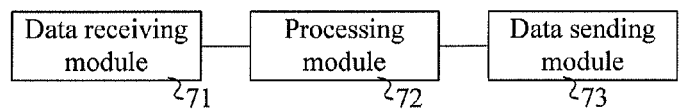
FIG. 7 is a schematic structural diagram of a radio self-backhaul device in an evolved network according to an embodiment of the present invention.

FIG. 7 is a schematic structural diagram of a radio self-backhaul device in an evolved network according to an embodiment of the present invention. As shown in FIG. 7, this embodiment includes: a data receiving module 71, a processing module 72, and a data sending module 73.

The data receiving module 71 receives uplink data sent by a NodeB by using downlink radio resources of the NodeB, where the uplink data is uplink data sent by a UE to the NodeB by using an uplink radio link and the radio self-backhaul device is set within the coverage of the NodeB and has cable transmission resources. The processing module 72 performs protocol processing on the uplink data received by the data receiving module 71. The data sending module 73 sends the uplink data that undergoes the protocol processing performed the processing module 72 to a core network by using a cable transmission link.

In the radio self-backhaul device in the evolved network according to this embodiment, the processing module 72 performs protocol processing on the uplink data sent by the NodeB by using the downlink radio resources of the NodeB and sends the uplink data that undergoes the protocol processing to the core network by using the cable transmission link. The NodeB implements the radio self-backhaul without occupying the radio resources of other NodeBs. The NodeB uses its downlink radio resources to send the uplink data, which saves the radio transmission resources of the NodeB without occupying the radio resources of other NodeBs, and mitigates the impact on the radio network throughput.

Further, based on the embodiment shown in FIG. 7, when the core network needs to send downlink data to the UE, the radio self-backhaul device in the evolved network may also process the downlink data as follows: The data receiving module 71 receives the downlink data sent by the core network by using the cable transmission link; the processing module 72 performs protocol processing on the downlink data received by the data receiving module 71; and the data sending module 73 sends the downlink data that undergoes the protocol processing performed the processing module 72 to the NodeB by using the uplink radio link.

The above procedures implement data exchange between a UE and the core network.

Figure 8:
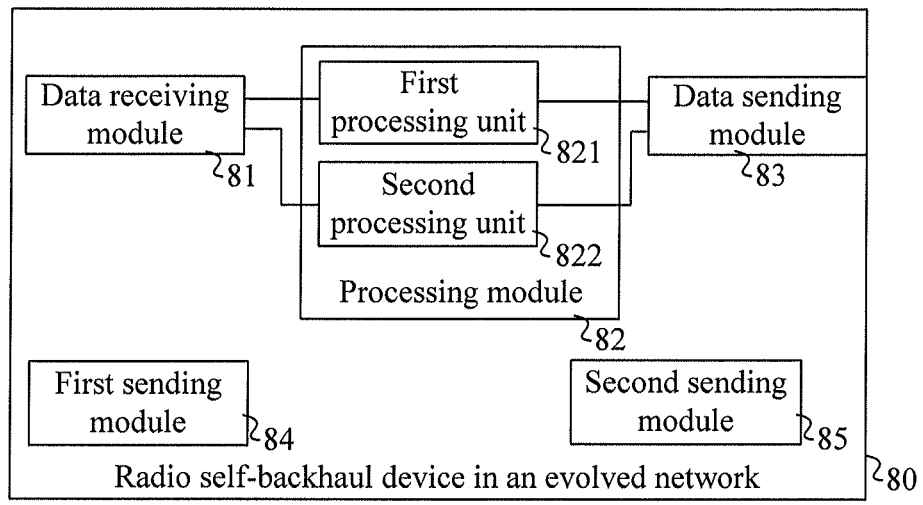
FIG. 8 is a schematic structural diagram of a radio self-backhaul device in an evolved network according to another embodiment of the present invention.

FIG. 8 is a schematic structural diagram of a radio self-backhaul device in an evolved network according to another embodiment of the present invention. As shown in FIG. 8, a radio self-backhaul device 80 in the evolved network according to this embodiment includes a data receiving module 81, a processing module 82, a data sending module 83, a first sending module 84, and a second sending module 85.

The data receiving module 81 receives uplink data sent by a NodeB by using downlink radio resources of the NodeB, where the uplink data is uplink data sent by a UE to the NodeB by using an uplink radio link and the radio self-backhaul device is set within the coverage of the NodeB and has cable transmission resources. The processing module 82 performs protocol processing on the uplink data received by the data receiving module 81. The data sending module 83 sends the uplink data that undergoes the protocol processing performed the processing module 82 to a core network by using a cable transmission link.

When the radio self-backhaul device initiates access, the first sending module 84 sends an access request message carrying a channel associated identifier of the radio self-backhaul device to the NodeB by using the access resources the same as a common UE so that the NodeB distinguishes the radio self-backhaul device and the common UE according to the channel associated identifier after receiving the access request message.

Alternatively, when the radio self-backhaul device initiates access, the second sending module 85 may send an access request message to the NodeB by using access resources different from the common UE so that the NodeB distinguishes the radio self-backhaul device and the common UE according to the different access resources.

According to this embodiment, after the access procedure initiated by the radio self-backhaul device in the evolved network is complete, because the core network does not need to obtain the information about the radio self-backhaul device, the NodeB does not send the information about the radio self-backhaul device in the evolved network to the core network. Therefore, the radio self-backhaul device in the evolved network is invisible in the core network, which reduces the signaling interaction.

Further, the processing module 82 may include: a first processing unit 821, a second processing unit 822. The first processing unit 821 removes the air interface protocol header data packet and adds a data link layer protocol header data packet. The second processing unit 822 removes the air interface protocol header, and adds a transport layer protocol header, an IP layer protocol header, and a data link layer protocol header. The first processing unit 821 and the second processing unit 822 may be set in the processing module 82 concurrently, or the first processing unit 821 or the second processing unit 822 may be set according to actual requirements so that the communication system can transmit data.

Further, based on the embodiment shown in FIG. 8, when the core network needs to send downlink data to the UE, the radio self-backhaul device in the evolved network may also process the downlink data as follows: The data receiving module 81 receives the downlink data sent by the core network by using the cable transmission link; the processing module 82 performs protocol processing on the downlink data received by the data receiving module 81; and the data sending module 83 sends the downlink data that undergoes the protocol processing performed the processing module 82 to the NodeB by using the uplink radio link.

The above procedures implement data exchange between a UE and the core network.

Figure 9:
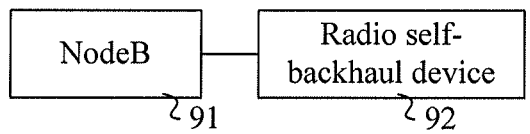
FIG. 9 is a schematic structural diagram of a radio self-backhaul system in an evolved network according to an embodiment of the present invention.

FIG. 9 is a schematic structural diagram of a radio self-backhaul system in an evolved network according to an embodiment of the present invention. As shown in FIG. 9, this embodiment includes: a NodeB 91 and a radio self-backhaul device 92.

The radio self-backhaul device 92 is located within the coverage of the NodeB 91 and provides radio backhaul for the NodeB 91.

The radio self-backhaul device 92 receives uplink data sent by the NodeB 91 by using downlink radio resources of the NodeB 91, where the uplink data is uplink data sent by a UE to the NodeB 91 by using an uplink radio link. The radio self-backhaul device 92 is set within the coverage of the NodeB 91 and has cable transmission resources. The radio self-backhaul device 92 performs protocol processing on the uplink data and sends the uplink data that undergoes the protocol processing to a core network by using a cable transmission link.

The radio self-backhaul device 92 receives downlink data sent by the core network by using the cable transmission link. The radio self-backhaul device 92 performs protocol processing on the downlink data and sends the downlink data that undergoes the protocol processing to the NodeB 91 by using an uplink radio link.

In the radio self-backhaul system in an evolved network according to this embodiment, after the radio self-backhaul device 92 performs protocol processing on the uplink data sent by the NodeB 91 by using the downlink radio resources of the NodeB 91, the NodeB 91 implements radio self-backhaul of the uplink data. The radio self-backhaul device 92 performs protocol processing on the downlink data from the core network and sends the downlink data that undergoes the protocol processing. The NodeB 91 implements radio self-backhaul without occupying the radio resources of other NodeBs. The NodeB 91 uses its downlink radio resources to send the uplink data, which saves the radio transmission resources of the NodeB 91 without occupying the radio resources of other NodeBs, and mitigates the impact on the radio network throughput.

Figure 10:
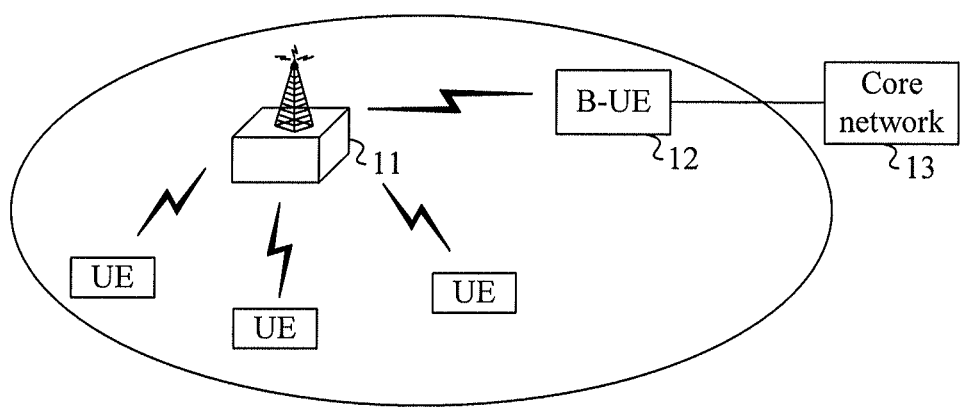
FIG. 10 is a schematic structural diagram of a radio self-backhaul system used in an evolved network to access a core network according to an embodiment of the present invention.

FIG. 10 is a schematic structural diagram of a radio self-backhaul system used in an evolved network to access a core network according to an embodiment of the present invention. As shown in FIG. 10, in this embodiment, the radio self-backhaul system includes: a NodeB 11 and a B-UE 12 serving as a radio access point. Multiple UEs are connected to the NodeB 11 by using radio links. The B-UE 12 serving as the radio access point is connected to the NodeB 11 by using a radio link and is connected to a core network 13 by using a cable link. The B-UE 12 is located within the coverage of the NodeB 11 and has cable resources.

When the B-UE 12 needs to transparently transmit uplink data at the IP layer and its upper transport layer, if a UE needs to send uplink data to the core network 13 via the NodeB 11, the NodeB 11 first sends the uplink data to the B-UE 12 by using a radio transmission link. The uplink data is added with an air interface protocol header. After receiving the uplink data, the B-UE 12 removes the air interface protocol header from the uplink data, and adds a data link layer protocol header to the uplink data so that the uplink data can be sent to the core network 13 by using a terrestrial physical link. If the UE needs to receive downlink data from the core network 13 via the NodeB 11, the B-UE 12 first receives the downlink data sent by the core network 13 by using the terrestrial physical link. The downlink data is added with a data link layer protocol header for data transmission on the terrestrial physical link. After receiving the downlink data, the B-UE 12 removes the data link layer protocol header from the downlink data, adds an air interface protocol header to the downlink data, and sends the downlink data to the NodeB 11 via a radio air interface. The NodeB 11 forwards the downlink data to the UE.

When the B-UE 12 needs to parse the data transmitted at the IP layer and the transport layer, if the UE needs to send uplink data to the core network 13 via the NodeB 11, the NodeB 11 first sends the uplink data to the B-UE 12 by using a radio transmission link. The uplink data is added with an air interface protocol header. After receiving the uplink data, the B-UE 12 removes the air interface protocol header from the uplink data, and adds a transport layer protocol header, an IP layer protocol header, and a data link protocol layer header to the uplink data so that the uplink data can be sent to the core network 13 by using a terrestrial physical link. If the UE needs to receive downlink data from the core network 13 via the NodeB 11, the B-UE 12 first receives the downlink data sent by the core network 13 by using the terrestrial physical link. The downlink data is added with a transport layer protocol header, an IP layer protocol header, a data link protocol layer header that are used for data transmission on the terrestrial physical link. After receiving the downlink data, the B-UE 12 removes the transport layer protocol header, the IP layer protocol header, and the data link layer protocol header from the downlink data, adds an air interface protocol header to the downlink data, and sends the downlink data to the NodeB 11 via a radio air interface. The NodeB 11 forwards the downlink data to the UE.

In the above embodiment of the present invention, it is not required that the site location of the NodeB 11 has cable backhaul resources, but only needs to be within the coverage of the NodeB 11. Data exchange can be implemented between the NodeB 11 and the core network 13 by using a B-UE 12 having cable transmission resources and an environment suitable for data transmission between the B-UE 12 and the NodeB 11. Data between the B-UE 12 and the NodeB 11 is transmitted by using a radio transmission link, and data between the B-UE 12 and the core network 13 is transmitted by using a cable transmission link. Because the B-UE 12 is a special UE, the NodeB 11 uses a scheduling algorithm suitable for the B-UE 12 to schedule the B-UE 12. During the process of scheduling the B-UE 12, the NodeB 11 sets the highest priority for the B-UE 12. The B-UE 12 is a UE for the NodeB 11 and is a cable data relay for the core network 13.

Therefore, the core network 13 does not need to perform initial access authentication and network authentication as required for a common UE.

In addition, the B-UE 12 may support double protocol stacks, namely, the air interface protocol stack and data link layer protocol stack. By setting the double protocol stacks, the uplink data can be transparently transmitted at the IP layer and its upper transport layer, or the radio self-backhaul device can parse and forward the uplink data at the IP layer and its upper transport layer.

During the process of radio backhaul, the backhaul traffic is transferred between the NodeB 11 and the core network 13 by means of data forwarding over the cable transmission link and the radio transmission link of the B-UE 12. In this way, radio self-backhaul for the NodeB 11 is implemented. Therefore, the NodeB 11, during the specific site selection, does not need to consider availability of the backhaul resource at the site location of the NodeB 11, which greatly facilitates the site selection and deployment of the NodeB 11, and reduces the construction costs of the radio network.

If the NodeB 11 performs inband self-backhaul, the B-UE 12 shares the spectrum resources with the UE within the coverage of the NodeB 11. If the NodeB 11 has a large amount of backhaul traffic, the B-UE 12 may perform outband self-backhaul by using the access spectrum resources different from a common UE served by the NodeB 11; that is, the B-UE 12 uses the radio spectrum resources not shared with the common UE within the coverage of the NodeB 11 to receive the uplink data from the NodeB. In this way, the normal data service throughput of the NodeB 11 is not affected.

Specifically, if the NodeB 11 performs inband self-backhaul, because the B-UE 12 shares the spectrum resources with the UE within the coverage of the NodeB 11, the actual throughput of the NodeB 11 is affected to some extent. However, because the data flow direction of the backhaul link of the NodeB 11 is reverse to the data flow direction of the access link of the NodeB 11, the asymmetry of the traffic of the uplink and downlink can be fully used to minimize the impact caused by the backhaul traffic of the NodeB 11 on the normal data service of the NodeB 11. Specifically, in the case of uplink data transmission, after receiving the uplink data from the UE, the NodeB 11 transmits the uplink data to the B-UE 12 by using the downlink radio resource of the NodeB 11. The UE has a small amount of uplink data and hence the backhaul traffic of the NodeB 11 occupies a few downlink radio resources; and therefore, the normal data transmission with a large amount of traffic is not affected greatly. Conversely, in the case of downlink data transmission, the NodeB 11 uses the uplink radio resources to receive the downlink data sent by the B-UE 12 from the core network. Because the downlink data is the data of the UE, the NodeB 11 has a large amount of backhaul data. However, because the UE has a small amount of uplink data, the uplink radio resources of the NodeB 11 can be used to implement downlink data backhaul so that the downlink radio resources of the NodeB 11 are not affected. Therefore, the impact on the radio network throughput is mitigated.

Persons skilled in the art may understand that all or part of steps according to the embodiments of the present invention may be implemented by a program instructing relevant hardware. The program may be stored in a computer readable storage medium. When the program is executed, the steps of the method in the embodiments are executed. The storage medium may be any medium capable of storing program codes, such as a ROM, a RAM, a magnetic disk, or a CD-ROM.

Finally, it should be noted that the foregoing embodiments are intended for describing the technical solution of the present invention other than limiting the present invention. Although the present invention is described in detail with reference to the foregoing embodiments, persons skilled in the art should understand that they can still make modifications to the technical solution described in the embodiments or make equivalent substitutions to some technical features of the technical solution without departing from the spirit and scope of the technical solution of the present invention.

What is claimed is:

1. A radio self-backhaul method, comprising:
a radio self-backhaul device, wherein the radio self-backhaul device is communicatively coupled to (i) a core network through a cable transmission link and (ii) a NodeB through a radio link, wherein the radio self-backhaul device is a first user equipment (UE) for the NodeB, and the radio self-backhaul device performs:
accessing the NodeB by using access resources which are the same as or different from access resources used by a second UE, wherein when the access resources used by the radio self-backhaul device are the same as the access resources used by the second UE, a channel associated identifier of the radio self-backhaul device is sent to the NodeB so that the NodeB distinguishes the radio self-backhaul device and the second UE according to the channel associated identifier, wherein when the access resources used by the radio self-backhaul device are different from the access resources used by the second UE, a channel associated identifier of the radio self-backhaul device is not sent to the NodeB so that the NodeB distinguishes the radio self-backhaul device and the second UE according to the different access resources;
receiving user uplink data that is sent by the NodeB using downlink radio resources of the NodeB and without occupying radio resources of other NodeBs, wherein the user uplink data is uplink data sent by the second UE to the NodeB using an uplink radio link;
protocol processing on the received user uplink data; and
sending the received user uplink data that are protocol processed in the radio self-backhaul device to the core network using the cable transmission link.

2. The method according to claim 1, the accessing procedure comprising:
sending, by the radio self-backhaul device, an access request message carrying the channel associated identifier of the radio self-backhaul device to the NodeB by using the access resources which are the same as the access resources used by the second UE.

3. The method according to claim 1, the accessing procedure comprising:
sending, by the radio self-backhaul device, an access request message to the NodeB by using the access resources different from the access resources used by the second UE.

4. The method according to claim 1, wherein protocol processing on the received user uplink data comprises:
when receiving the user uplink data from the NodeB, removing, by the radio self-backhaul device, an air interface protocol header, adding a data link layer protocol header.

5. The method according to claim 1, wherein the protocol processing on the received user uplink data comprises:
when receiving the user uplink data from the NodeB, removing, by the radio self-backhaul device, an air interface protocol header, adding a transport layer protocol header, an Internet Protocol (IP) layer protocol header, and a data link layer protocol header.

6. The method according to claim 1, wherein the radio self-backhaul device further performs:
receiving downlink data sent by the core network by using the cable transmission link;
protocol processing on the received downlink data; and
sending the received downlink data that are protocol processed in the radio self-backhaul device to the NodeB using the uplink radio link.

7. The method according to claim 6, wherein the protocol processing on the received downlink data comprises:
when receiving the downlink data from the core network, removing by the radio self-backhaul device, a data link layer protocol header, and adding an air interface protocol header; or
when receiving the downlink data from the core network, removing by the radio self-backhaul device, a transport layer protocol header, an Internet Protocol (IP) layer protocol header, and a data link layer protocol header, and adding an air interface protocol header.

8. The method according to claim 1, wherein the receiving user uplink data that is sent by the NodeB comprises:
receiving the user uplink data from the NodeB by using radio spectrum resources shared with the second UE within the coverage of the NodeB; or
receiving the user uplink data from the NodeB by using radio spectrum resources not shared with the second UE within the coverage of the NodeB.

9. The method according to claim 1, wherein, the NodeB is an evolved NodeB (eNodeB), and the core network is a system architecture evolution gateway (SAE-GW) or a mobility management entity (MME).

10. The method according to claim 1, wherein the radio self-backhaul device is assigned a higher priority than the second UE.

11. A radio self-backhaul device, communicatively coupled to (i) a core network through a cable transmission link and (ii) a NodeB through a radio link, wherein the radio self-backhaul device is a first user equipment (UE) for the NodeB, and the radio self-backhaul device comprises a processing hardware platform executing instructions stored on a non-transitory computer-readable storage medium, the instructions are executed which cause the radio self-backhaul device to:
access the NodeB by using access resources which are the same as or different from access resources used by a second UE, wherein when the access resources used by the radio self-backhaul device are the same as the access resources used by the second UE, a channel associated identifier of the radio self-backhaul device is sent to the NodeB so that the NodeB distinguishes the radio self-backhaul device and the second UE according to the channel associated identifier, wherein when the access resources used by the radio self-backhaul device are different from the access resources used by the second UE, a channel associated identifier of the radio self-backhaul device is not sent to the NodeB so that the NodeB distinguishes the radio self-backhaul device and the second UE according to the different access resources;
receive user uplink data that is sent by the NodeB using downlink radio resources of the NodeB and without occupying radio resources of other NodeBs, wherein the user uplink data is uplink data sent by the second UE to the NodeB using an uplink radio link;
protocol process on the received user uplink data; and
send the received user uplink data that are protocol processed in the radio self-backhaul device to the core network using the cable transmission link.

12. The device according to claim 11, wherein when accessing the NodeB, the radio self-backhaul device:
sends an access request message carrying the channel associated identifier of the radio self-backhaul device to the NodeB by using the access resources which are the same as the access resources used by the second UE; or
sends an access request message to the NodeB by using the access resources different from the access resources used by the second UE.

13. The device according to claim 11, wherein when protocol processing on the received user uplink data, the radio self-backhaul device:
removes an air interface protocol header and adds a data link layer protocol header.

14. The device according to claim 11, wherein when protocol processing on the received user uplink data, the radio self-backhaul device:
removes an air interface protocol header, and adds a transport layer protocol header, an Internet Protocol (IP) layer protocol header, and a data link layer protocol header.

15. The method according to claim 11, wherein the instructions are executed which cause the radio self-backhaul device further to:
receive downlink data sent by the core network by using the cable transmission link;
protocol process on the received downlink data; and
send the received downlink data that are protocol processed in the radio self-backhaul device to the NodeB using the uplink radio link.

16. The method according to claim 15, wherein the protocol processing on the received downlink data, the radio self-backhaul device:
removes a data link layer protocol header, and adds an air interface protocol header; or
removes a transport data layer protocol header, an Internet Protocol (IP) layer protocol header, and a data link layer protocol header, and adds an air interface protocol header.

17. A radio self-backhaul system, comprising:
a radio self-backhaul device, a second user equipment (UE), and a NodeB, wherein the radio self-backhaul device is a first UE for the NodeB and is communicatively coupled to (i) a core network through a cable transmission link and (ii) the NodeB through a radio link, and the radio self-backhaul device comprises a processing hardware platform executing instructions stored on a non-transitory computer-readable medium, the instructions are executed which cause the radio self-backhaul device to:
access the NodeB by using access resources which are the same as or different from access resources used by the second UE, wherein when the access resources used by the radio self-backhaul device are the same as the access resources used by the second UE, a channel associated identifier of the radio self-backhaul device is sent to the NodeB so that the NodeB distinguishes the radio self-backhaul device and the second UE according to the channel associated identifier, wherein when the access resources used by the radio self-backhaul device are different from the access resources used by the second UE, a channel associated identifier of the radio self-backhaul device is not sent to the NodeB so that the NodeB distinguishes the radio self-backhaul device and the second UE according to the different access resources;

receive user uplink data that is sent by the NodeB using downlink radio resources of the NodeB and without occupying radio resources of other NodeBs, wherein the user uplink data is uplink data sent by the second UE to the NodeB using an uplink radio link;

protocol process on the received user uplink data; and send the received user uplink data that are protocol processed in the radio self-backhaul device to the core network using the cable transmission link.

* * * * *